United States Patent
Trommer

(10) Patent No.: US 6,332,829 B1
(45) Date of Patent: Dec. 25, 2001

(54) POLISHING METHOD AND DEVICE

(75) Inventor: David Trommer, Kfar Vradim (IL)

(73) Assignee: MPM Ltd., Haifa (IL)

(*) Notice: Subject to any disclaimer, the term of this patent is extended or adjusted under 35 U.S.C. 154(b) by 0 days.

(21) Appl. No.: 09/563,918

(22) Filed: May 4, 2000

(51) Int. Cl.$^7$ .................................................. B24B 1/00
(52) U.S. Cl. .......................... 451/28; 451/35; 451/41; 451/113
(58) Field of Search .................. 451/28, 36, 37, 451/35, 41, 104, 106, 113

(56) References Cited

U.S. PATENT DOCUMENTS 5,404,680 * 4/1995 Mizuguchi et al. .................. 451/36
5,931,718 * 8/1999 Komanduri et al. .................. 451/36

* cited by examiner

*Primary Examiner*—Joseph J. Hail, III
*Assistant Examiner*—David B. Thomas
(74) *Attorney, Agent, or Firm*—Eitan, Pearl, Latzer & Cohen-Zedek

(57) ABSTRACT

A system for polishing a surface including a polishing material and one or more magnetic means in contact with the polishing material. The one or more magnetic means react upon the polishing material to plasticize it, whereby the plasticized material is then used to polish the surface. Preferably the polishing material intermittently and repeatedly contacts with the surface for polishing.

A method for polishing a planar surface including bringing two or more magnetic means into contact with a polishing material, thereby plasticizing the polishing material. Then a planar side of the surface contacts the plasticized polishing material, so that the plasticized polishing material polishes the surface. Upon contact with the surface, the plasticized polishing material liquidizes. After termination of the contact with the surface, the liquidized polishing material solidifies. The surface is moved and the above steps are repeated a multiplicity of times until the surface is polished.

31 Claims, 7 Drawing Sheets

POLISHING METHOD AND DEVICE

FIELD OF THE INVENTION

The present invention relates generally to methods and devices for polishing and, in particular, to polishing of surfaces with magnetic polishing fluids (MPF).

BACKGROUND OF THE INVENTION

There exist, known in the art, systems for polishing optical lenses. Some of these systems utilize a magnetorheological polishing substance known as a polishing slurry. Typically, the slurry is a mixture of magnetorheological compound, abrasive particles, and stabilizers.

When not acted upon by magnetic forces, the slurry is commonly in a liquid state. However, once acted upon by such a force, the slurry becomes much more viscous, pushing the abrasive particles to the surface of the liquid. This more viscous slurry, with the abrasives protruding from the surface, is then utilized as a polishing tool for abrading and polishing a work piece surface. Kardonsky et al. in U.S. Pat. Nos. 5,677,948 and 5,449,313 describes such a system.

In order for the magnetorheological polishing device to be most efficient when being used as a polishing tool, it should be hard enough to apply sufficient force to firmly press the abrasive particles to the surface of the work piece. The polishing devices utilized in prior art systems acquire viscous, almost plasticized, properties known as Bingham properties, under the influence of magnetic forces. At this point, the device is hard enough to be used as a polishing tool. However, prior art devices reach this fully developed Bingham state only once, at the onset of the polishing movement, Thereafter, once the movement of the work piece relative to the slurry commences, the slurry no longer sustains the Bingham properties, and the slurry loses the plasticized properties. Hence, although they become more viscous, they ultimately remain in the liquid state. Thus, frequently the liquid does not have sufficient force to push the submerged abrasive particles firmly against the polishing surface and, consequently, the abrasives do not efficiently abrade the work piece.

Additionally, polishing of the work piece is carried out in stages. At any given time a small surface area is polished. This area is defined by the size of a zone, known as the polishing zone, which is small relative to the size of the work piece. Thus the work piece is polished zone by zone. This approach hinders the achievement of uniform polishing across the entire surface of the work piece. Non-uniform work pieces, such as silicon wafers, present a potential problem in devices such as semi-conductors.

An additional problem is the non-uniformity of the magnetic field, which affects the affectivity of the polishing zone. The magnetic field on the magnet's edge is almost an order of magnitude higher than that at the center of the magnet. Therefore, the visco-plastic properties of the slurry in the polishing zone are non-uniform, contributing to non-uniform polishing of the surface.

SUMMARY

It is an objective to provide an improved device for polishing of planar surfaces.

There is therefore provided, in accordance with a preferred embodiment of the present invention, a system for polishing a surface. The system includes an MPF and one or more magnetic means in contact with the MPF. The one or more magnetic means react upon the MPF to plasticize it, whereby the plasticized material is then used to polish the surface. Preferably the MPF intermittently and repeatedly contacts with the surface for polishing.

The system preferably also includes a means for intermittently magnetizing the one or more magnetic means. Additionally, the one or more magnetic means may be one or more permanent magnets placed in alternating directions. The means for intermittently magnetizing may be a shuttle for intermittently acting upon the one or more magnetic means, causing the magnetic means to provide a magnetic field when acted upon.

Alternatively, the one or more magnetic means may be one or more electro-magnets, and these electromagnets may be driven by a controlled current or an alternating current (AC).

The system may further include a cylinder, wherein the one or more magnetic means are laid along the longitudinal axis of the cylinder, which is rotatable along the longitudinal axis, and the plasticized material covers the cylinder. The one or more magnetic means are either flush with, protrude from, or are recessed within the outer surface of the cylinder. The magnetic means may have a spiral pattern.

The system may further include a vessel holding a pool of the polishing material, wherein a lower portion of the cylinder sits in the pool. The cylinder may further include an array of tubes containing a supply of the polishing material for secreting onto the outer surface of the cylinder. Additionally, the system may include a trimmer.

The system may include either a wire mesh or a metal-wool blanket covering the cylinder. The blanket includes ferromagnetic materials or non-metal materials.

Alternatively, the cylinder may include a ferro-magnetic mandrel, inserted co-axially into the center of the cylinder, wherein an outer surface of the mandrel contacts with the magnetic means, causing the magnetic means to change magnetic field upon contact, or the cylinder may include an array of electromagnets.

There is therefore provided, in accordance with a preferred embodiment of the present invention, a method for polishing a planar surface. The method includes bringing two or more magnetic means into contact with a MPF, thereby plasticizing the polishing material. Then a planar side of the surface contacts with the plasticized polishing material, so that the plasticized polishing material polishes the surface. Upon contact with the surface, the plasticized MPF liquidizes. After termination of the contact with the surface, the liquidized polishing material solidifies. The surface is moved, and the above steps are repeated a multiplicity of times until the surface is polished.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention utilizes magnetic polishing fluids (MPF) in a novel polishing system. The invention exploits the firmness and flexibility provided by the combination of magnetorheological suspensions (MRS) with ferrofluids (FF) and abrasive powders as well as chemical etchants, stabilizers, pH control agents and other additives in order to provide a more efficient, improved polishing device. The MPF is fully described in a pending application U.S. No. 60/132,813, assigned to a common assignee and included herein by reference.

Figure 1:
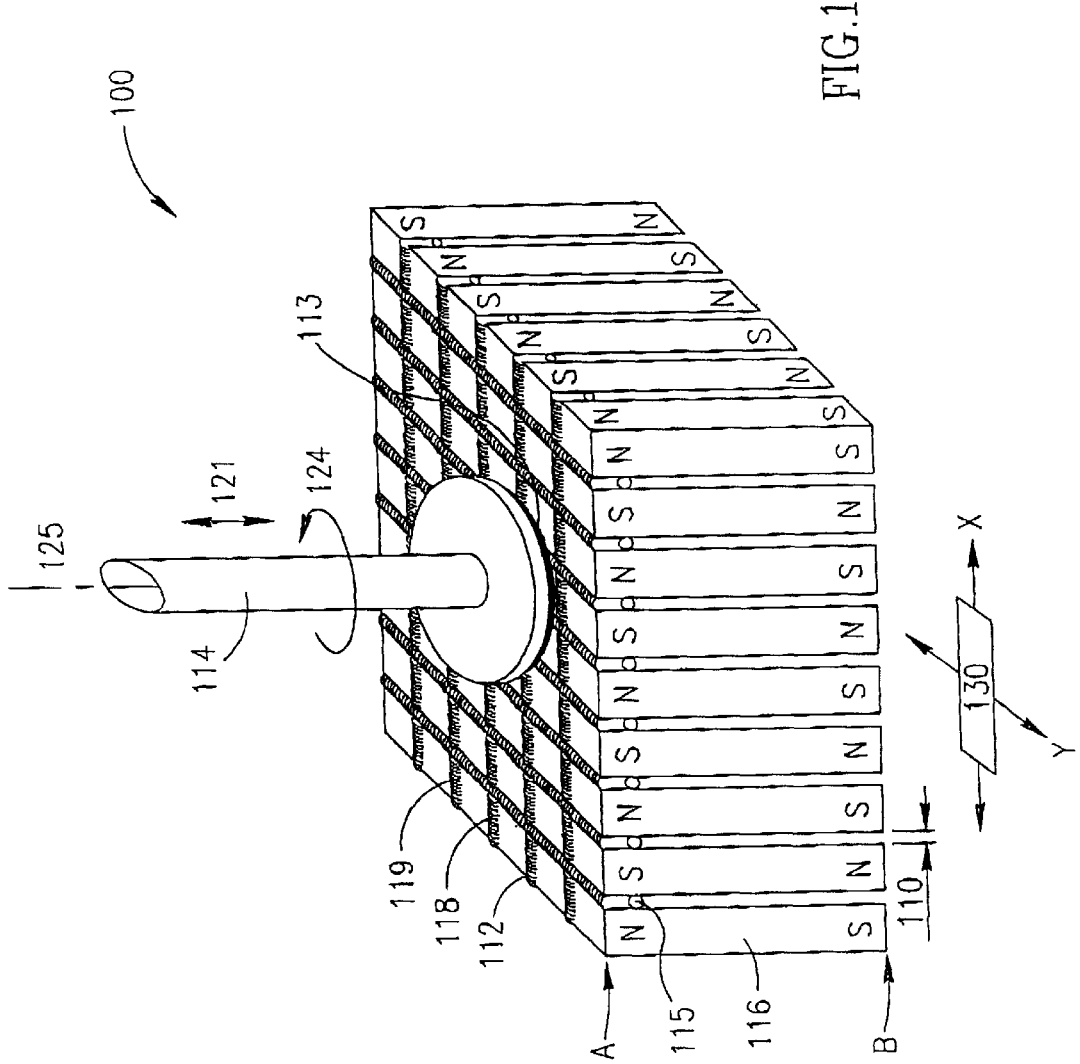
FIG. 1 is a schematic illustration of a polishing system constructed and operative in accordance with a preferred embodiment of the present invention.

Reference is now made to FIG. 1, which depicts a system 100 for polishing of planar surfaces such as silicon wafers for ultralarge scale integration (ULSI), constructed and operative in accordance with a preferred embodiment of the present invention.

System 100 polishes the surface of a work piece 113 via a series of intermittent impacts from plasticized quasi-solid Magnetic Polishing Fluid (MPF) 112. MPF 112, under the influence of magnetic forces, acquires Bingham properties, and thus operates in the plasticized region, rather than in the liquid (Newtonian) region as is done in prior art. It is noted that the texture acquired by the MPF 112 in the plasticized region is stiffer than that acquired in the liquid region, and hence, when plasticized, MPF 112 is more effective as a polishing tool. In some instances work piece 113 is planar, curved or etched.

The present invention provides a higher rate of removal of fragments from the surface of the work piece 113, and hence system 100 provides a faster polishing system than prior art systems. Furthermore, in contrast to prior art systems which induce point magnetization, and thus require extensive repeated cycling in order to sweep polish the entire work piece, the present invention teaches full planar magnetization. Therefore, in a preferred embodiment, system 100 sweep polishes the work piece in one cycle. The number of cycles is governed by the type and thickness of the material to be removed, regardless of the size of the area to be polished, thus ensuring better surface uniformity.

System 100 comprises a matrix of permanent magnetic dipoles 116, grouped in a predetermined pattern so as to create a smooth flat surface A and an opposing surface B. The area of surface A is preferably greater then the projected area of the work piece 113. The flatness of surface A may be achieved by assembly techniques and/or post assembly surface machining and lapping. The preferable size of the matrix is 1000×400 mm for current size silicon wafers on the market.

The faces of the magnets 116 as they form surface A are arranged in alternating directions, i.e. adjacent magnets 116 are of opposite polarity: North, South, North, South, etc. The preferable size of each magnet 116 is 20*20 mm, and the gap between them, designated 110, is up to 5 mm, preferably 0.1–0.5 mm. The magnets 116 provide a magnetic field 118, which acts upon MPF 112.

A soft iron shuttle 130 slides across surface B. Preferably shuttle 130 is of a minimal width equal to the width of the gap 110 plus twice the thickness of a single magnet 116. The preferable length of shuttle 130 is equal to the longest dimension of surface B The iron shuttle 130 slides over surface B, shorting or connecting the adjacent poles 116 as appropriate. The series of shorts or connections causes a change in the strength and geometry of magnetic field 118 Iron shuttle 130 moves along either the x or the y axis, preferably in a combination of both directions, and, alternatively in a rotary motion as well. The rate of change in the properties of magnetic field 118 is proportional to the translation velocity of shuttle 130.

The MPF 112 is deposited so as to cover the top of surface A. Due to the magnetic field 118, the MPF 112 acquires some specific mechanical properties. As dictated by the geometry and arrangement of the magnetic field 118, MPF 112 takes on a crisscrossed shaped pattern of convex shapes.

Preferably MPF 112, which is described in U.S. provisional application 60/132,813 and included herein by reference, is a combination of magnetorheological substance (MRS), ferrofluid (FF), abrasives 119 and other components for stabilization etch rate and pH control, which acquires Bingham properties under the influence of an applied magnetic field 118.

The change in the strength of field 118 changes the state of MPF 112 from a Newtonian state to a Bingham state, or vice versa. When the MPF 112 is in the Bingham state, it forms a rigid porous matrix with the trapped abrasive particles 119 pushed to the surface.

The ferrofluid is pushed up through the porous Theological media due to capillary forces and is concentrated in the shallows of the upper face of MPF 112, thus smoothing out and planarizing the abrasive surface. The ferrofluid displays Theological behavior under the influence of field gradients, albeit to a substantially lesser degree than the other Theological components of MPF 112. These gradients push the abrasives toward the upper surface of the ferrofluid. Planar work piece 113 is held in a horizontal position by a rotatable chuck 114, and rotates in a plane parallel to surface A around axes 125, as illustrated by arrow 124. Chuck 114, which is also capable of vertical movement 121, lowers work piece 113 onto the surface of MPF 112, bringing work piece 113 into contact with abrasive particles 119. Particles 119, being held at the surface of MPF 112 by the application of magnetic field 118 thereto, impact with work piece 113, shaving off a fragment of the work piece. The distance between the surface of MPF 112 and work piece 113, is adjustable by coaxial movement of axis 121. Thus the work piece may be submerged in MPF 112 or may just touch its surface, achieving different levels of polishing parameters.

When the work piece 113 contacts MPF 112, the MPF loses its Bingham properties and liquidizes. However, due to the movement of the iron shuttle 130, described above, magnets 116 are intermittently shorted and magnetic field 118 is intermittently reapplied. Thus, with each reapplication of magnetic field 118, MPF 112 re-plasticizes and re-impacts with work piece 113, causing repeated intermittent shaving of the planar surface of the work piece 113.

The physical explanation of this phenomenon is as follows: When magnetic field 118 is applied to MPF 112, the MPF 112 acquires the properties of a plasticized solid whose yield point depends on the intensity of field 118. In this plasticized state, abrasive particles 119 are effectively held on the surface of the MPF 112. However, upon impact with the work piece 113, the shear stress of the MPF 112 exceeds the yield point, and the MPF112 liquidizes. At this point, the abrasives 119 are suspended in a liquid matrix, in a Newtonian-like fluid.

Therefore, in order to provide an effective polishing process, it is preferable to prevent MPF 112 from permanently crossing the yield point into the liquid state. Thus, the present invention teaches repeated application of the magnetic field 118. hence, once the plasticized Bingham state of the MPF collapses, magnetic field 118 is reapplied, and the Bingham properties are recovered, allowing the MPF 112 to regain the plasticized properties. The MPF 112 hence acquires rigid properties and the polishing process is similar to a succession of impacts of a rigid tool on the surface of the work piece 113.

It is noted that the constant renewal of the magnetic field 118, as taught herein, operates in contrast to the methods of continuous magnetic field application known in the art. In the prior art, MPF 112 acquires plasticized properties at the commencement of the polishing cycle only, and upon the first impact with the work piece 113 reverts to a liquid state and remains therein. Therefore, the polishing process is a continuous massage in which the abrasives 119 are continuously submerged in a semi-liquid state.

As needed to compensate for projected losses of MPF 112, an array of tubes 115 supplies the MPF 112, abrasive materials 119 and chemicals to surface A Additionally, the supply tubes 115 may also carry chemicals to control polishing parameters (e.g. removal rate, surface passivation, etc.).

In an alternative embodiment of the present invention (not shown), the direction of the magnetic dipoles 116 is unified, for example, the polarity on the side facing surface A is north only. Thus, the magnetic field gradients are stronger and the shaving/polishing force of the ferrofluidic components of the MPF 112 upon the working piece 113 is greater. Also, the force of the main rheological component is lower. There are materials that may benefit from such a polishing regime.

The iron shuttle 130 may also be of varying cross sections, and the distance between shuttle 113 and plane B may also vary. Alternatively, the shuttle 130 can be a grid of paramagnetic material pieces of a shape and arrangement similar to that of the dipoles 116.

Figure 2:
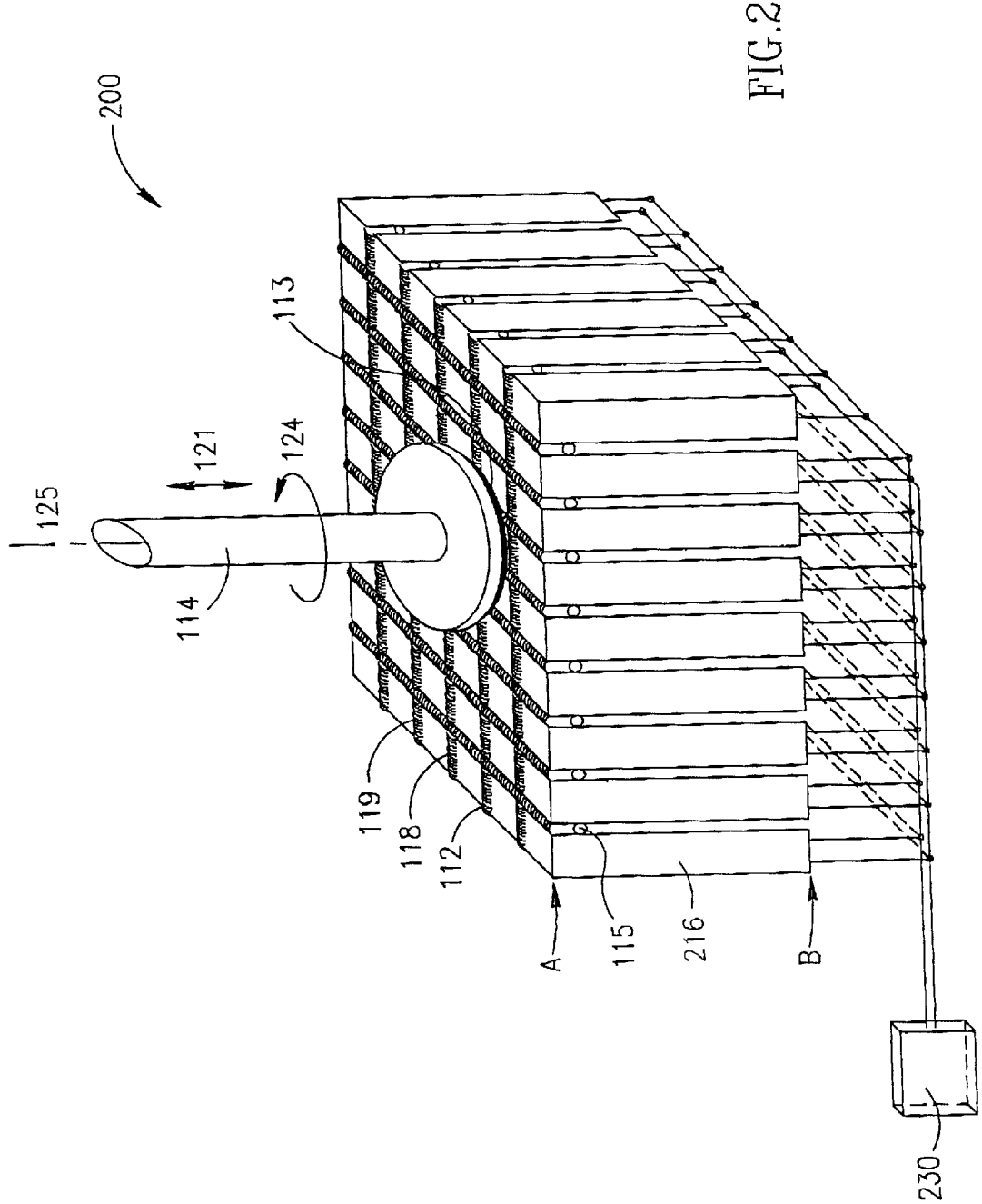
FIG. 2 is a schematic illustration of an alternative preferred embodiment of the polishing system illustrated in FIG. 1.

Reference is now made to FIG. 2, an illustration of a polishing system 200, an alternative embodiment of the present invention. Elements similar to those depicted in FIG. 1 are similarly referenced and will not be further described.

Similarly to system 100, wherein the magnetic force 118 is supplied by the magnets 116, in system 200 the force is supplied by a matrix of electromagnets 216. A pulse generation unit 230 supplies intermittent current to the electromagnets 216. The pulse train sequence, duty cycle, amplitude and polarity are controllable. The current may be pulsed between any two values, preferably between a small "holding current" value of ~0.2A and a peak value A pulse of current to any of the magnets 116 creates a pulse in magnetic field 118 that in turn, and as described hereinabove, transfers the MPF 112 from the liquid state to the Bingham state.

The ferromagnetic components of the MPF 112 may be injected during the "off" portions of the pulse trains via tubes 115, as described above.

In order to compensate for heat radiation as a result of copper losses, the matrix of electromagnets 216 is immersed in a liquid coolant, a transformer oil for example, (not shown) that "pumps out" the heat mainly via a heat exchanger (not shown).

In this embodiment, and in contrast to the system 100, the direction of the magnetic dipoles 116 is not fixed and, therefore a polarity field of either unified or alternating directional pattern is obtainable via the controllable pulse generation unit 230. This permits either a strong magnetic field that enhances the polishing force, or a weak magnetic field that will allow a more precise utilization of the polishing process or both simultaneously in different locations.

In both the embodiments described in reference to FIGS. 1 and 2, a reciprocal movement of plane A is also possible in addition to or instead of the movement of work plane 113.

Figure 3:
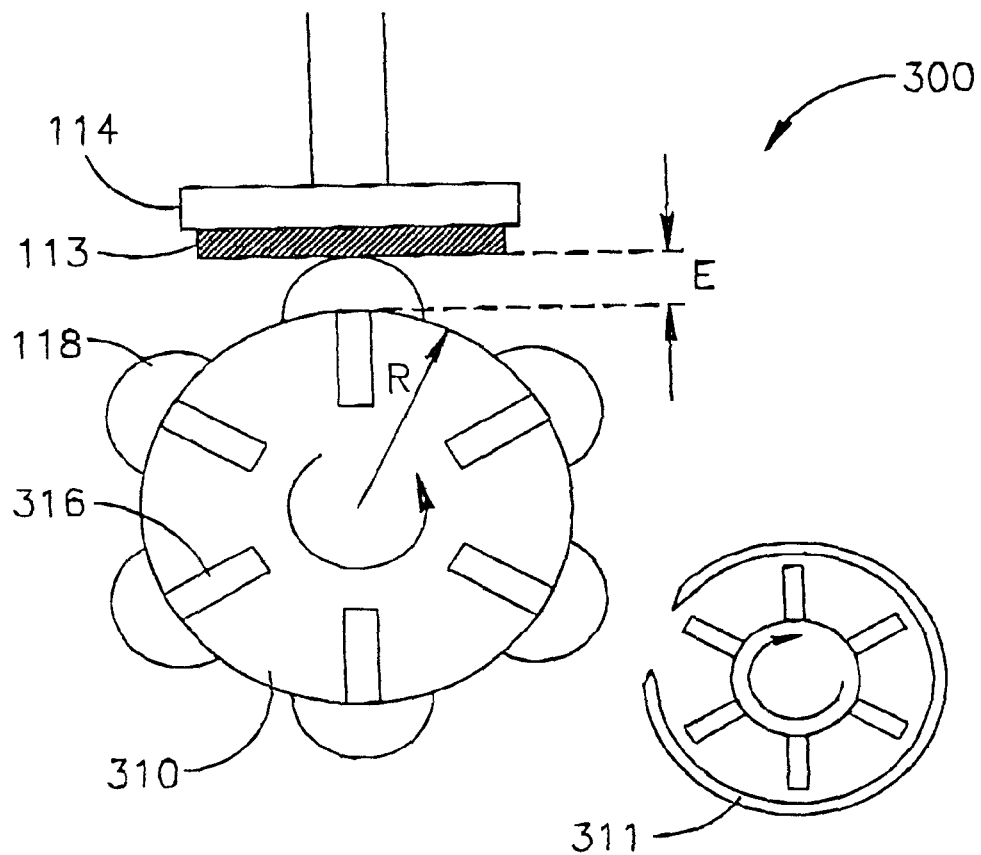
FIG. 3 is a side view of an alternative polishing system constructed and operative in accordance with a preferred embodiment of the present invention.

Reference is now made to FIG. 3, an illustration of polishing system 300, an alternative preferred embodiment of the present invention. Elements similar to those depicted in previous figures are similarly referenced and will not be further described.

System 300 comprises a cylinder 310 with several long magnets 316 imbedded along the outside circumference of cylinder 310. Cylinder 310 is preferably of radius R, rotates along its longitudinal axis, and is longer than the working dimension of the work piece 113.

Magnets 316 are flush with the outside surface of cylinder 310 or, alternatively, protrude from the surface of cylinder 310. Additionally, magnets 316 are magnetized in the direction of the radii and are arranged for identical poles to face outward or, alternatively, for alternating poles to face outward.

Cylinder 310 is lowered horizontally into a vessel (not shown) such that cylinder 310 contacts MPF 112. Cylinder 310 is placed adjacent to a trimming device (trimmer) 311 by mechanical means that provide for their relative controllable position. The trimmer 311 controls the MPF thickness on the magnetic poles by cutting off excesses and replenishing depleted quantities. Rotating chunk 114 holds work piece 113 at a distance E above the surface of cylinder 310.

Magnets 316 produce magnetic field 118, which acts upon MFP 112, shaping and solidifying MFP 112 into a plasticized system of periodic ridges and valleys. The ridges are higher than distance E. The plasticization of MPF 112 pushes abrasive particles to the outer circumference of MPF 112, covering the ridges as well as the valleys.

Cylinder 310 rotates relative to work piece 113, causing the semi-solid ridges of MPF 112, along with abrasive particles covered thereto, to periodically impact the surface of work piece 113. With each impact, chips of work piece 113 are shaved off, thereby performing an act of abrasion. The removal rate of material from the work piece 113 can be controlled by controlling the speed of rotation and the distance E for given properties of MPF 112 and magnets 316.

It is noted that each time semi-solid MPF 112 impacts the surface of work piece 113, MPF 112 liquidizes. However, generally, immediately following impact, the stress is removed due to loss of contact, and MPF 112 replasticizes, preparing for another impact with work piece 113.

Figure 4A:
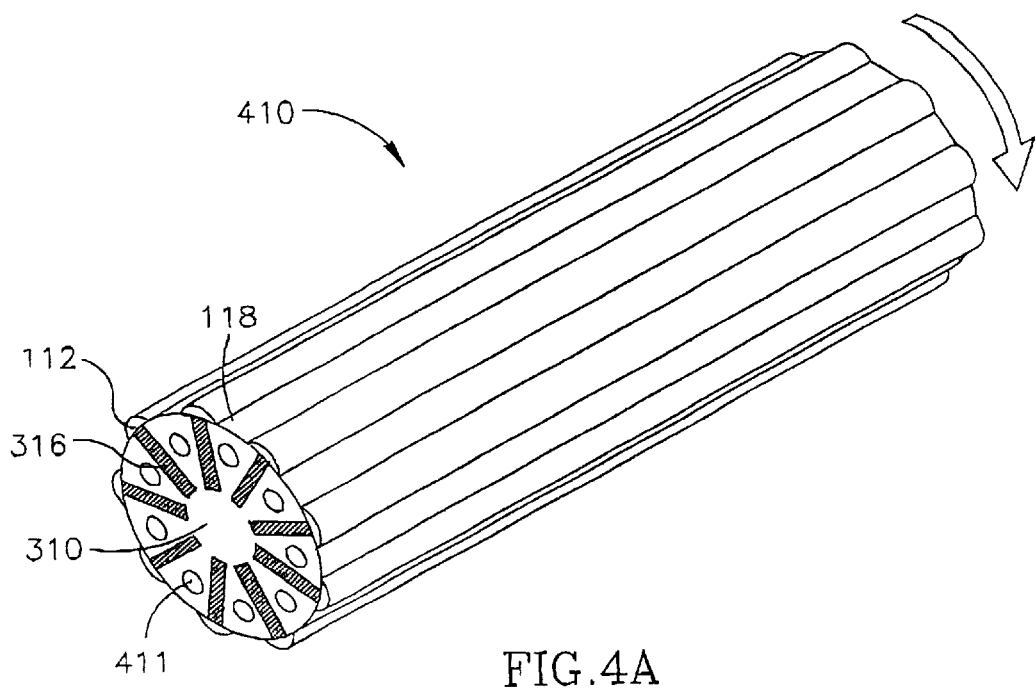
FIG. 4A is a schematic illustration of an alternative preferred embodiment of the polishing system illustrated in FIG. 3.
Figure 4B:
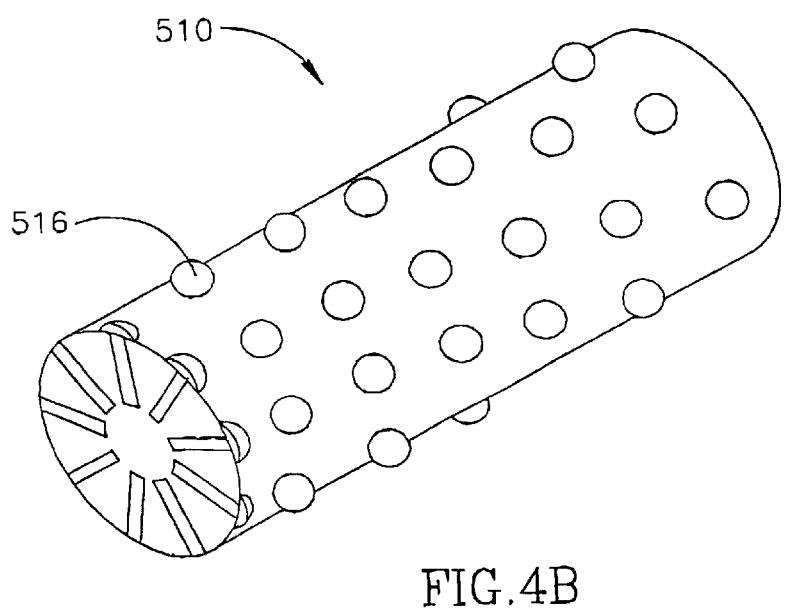
FIG. 4B is a detailed illustration of a portion of the system illustrated in FIG. 4A.

Reference is now made to FIGS. 4A and 4B, which illustrate alternative cylinders 410 and 510, which are usable in polishing system 300. Elements similar to those depicted in previous figures are similarly referenced and will not be further described.

Cylinder 410 comprises an array of tubes 411 positioned between the dipoles 316. Tubes 411 contain a supply of MPF 112, which secretes therefrom onto the outer surface of the cylinder as needed. Alternatively, tubes 411 also contain a supply of chemical and abrasive components.

Cylinder 510 comprises magnet dipoles 516 positioned along the longitudinal axis of cylinder 510. The magnet dipoles 516 are in a spiral pattern. Additionally, the magnets may also be protruding from the cylinder's surface.

In an alternative cylinder (not shown) each dipole 316 comprises a cluster of thin, long magnets in an alternating-poles arrangement. These poles of combined magnets may be grouped in a cassette that is inserted into the cylinder as an interchangeable unit. Alternatively, the cylinder surface (including the magnetic poles) is covered by a wire mesh of fine gauge wire 0.1 mm to 0.5 mm thick, or a thin laminated metal-wool blanket preferably 0.5 mm to 1 mm thick (not shown). Preferably, the wire mesh or metal-wool blanket is made of ferromagnetic materials. Additionally, the cylinder surface is covered with mesh-wise, laminated, or porous non-metal materials. It is to be noted, that the cylinder outer surface may be shaped or profiled.

Figure 5:
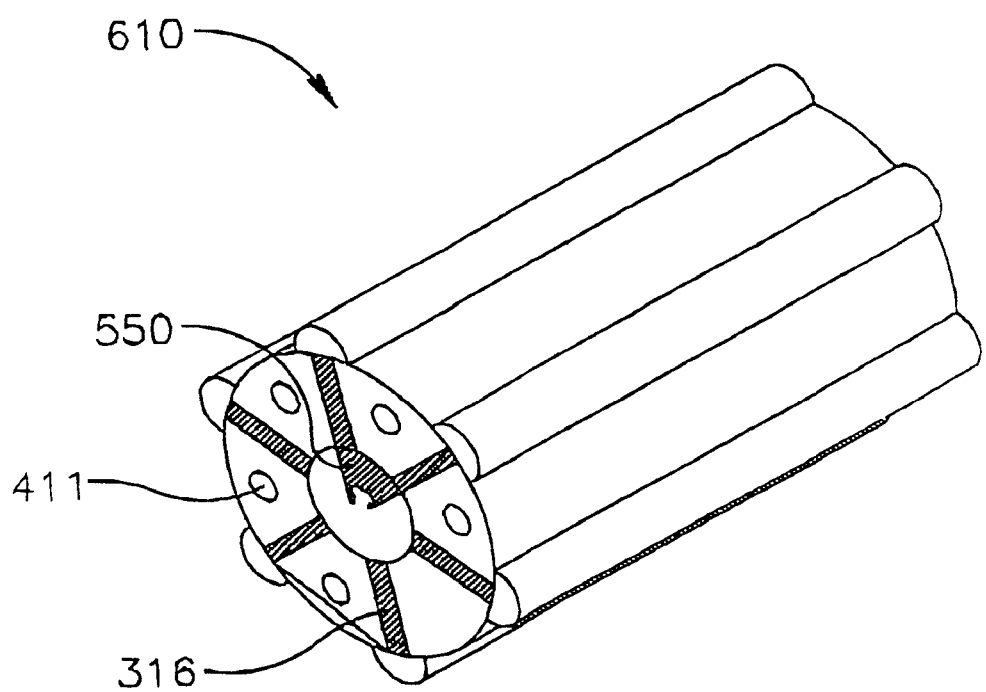
FIG. 5 is a schematic illustration of a further preferred embodiment of the polishing system illustrated in FIG. 3.

Reference is now briefly made to FIG. 5, which illustrates an alternative cylinder 610, operated and constructed according to a preferred embodiment of the present invention. Elements similar to those depicted in previous figures are similarly referenced and will not be further described.

Cylinder 610 comprises ferro-magnetic mandrel 550, inserted co-axially into the center of cylinder 610. The outside diameter of mandrel 550 contacts the imbedded poles of magnets 316 Magnets 316 pass above the ferro-magnetic portions of the mandrel 550, causing a change in magnetic field strength thereto and enhancing the magneto-rheological phenomena in applicable locations.

Figure 6:
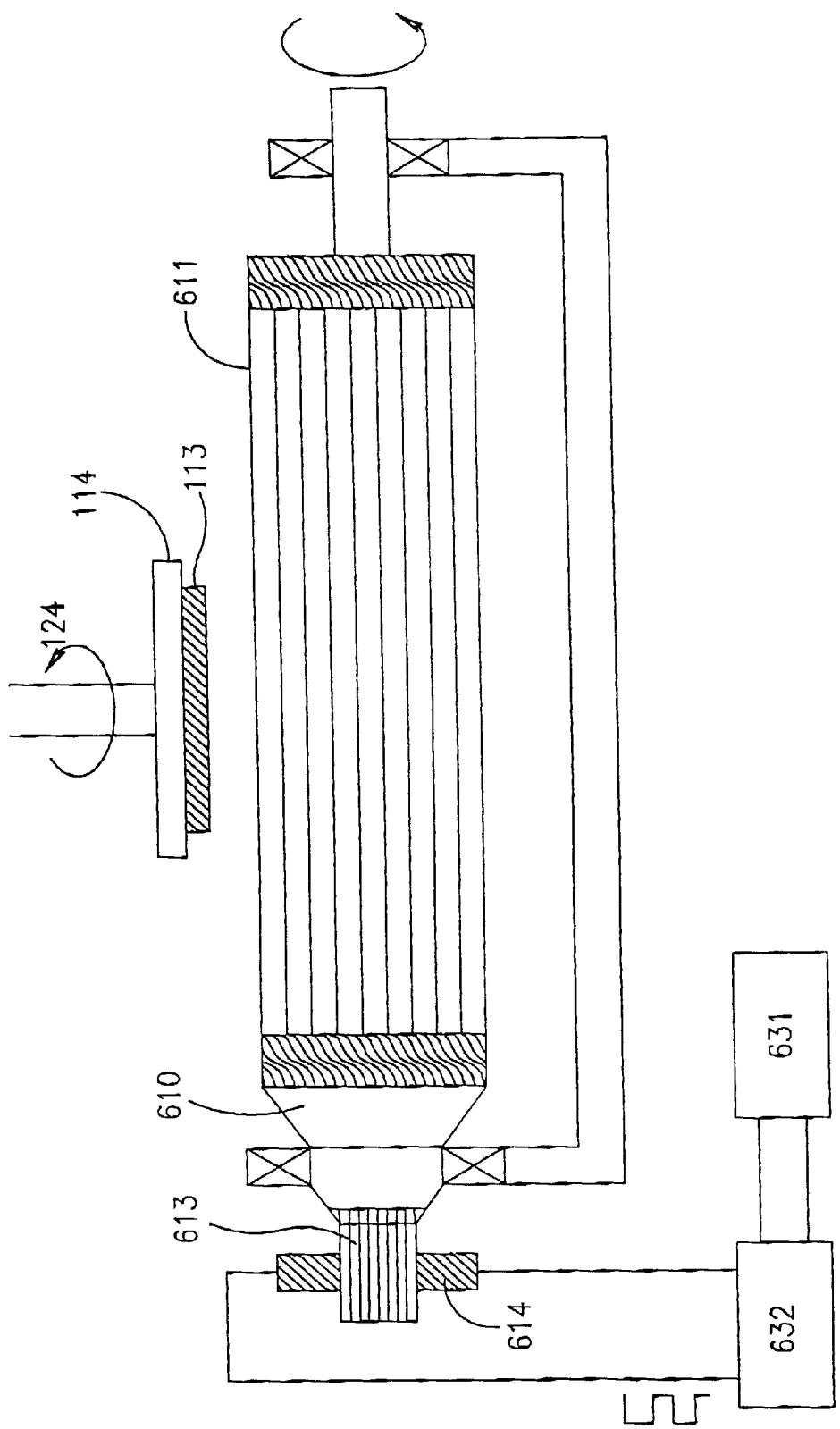
FIG. 6 is a schematic illustration of a yet further preferred embodiment of the polishing system illustrated in FIG. 3.

Reference is now made to FIG. 6, which illustrates yet another embodiment of the present invention. Elements similar to those depicted in previous figures are similarly referenced and will not be further described.

Polishing cylinder 710 comprises an array of electromagnets 611, very similar to a rotor of an electric direct current (DC) motor.

An electric current is supplied through a rotor 613 by brushes 614 or, preferably, by a brushless arrangement such as in a car's alternator. A power source unit 631 supplies a current to the rotor 613 through a current control unit 632 that chooses the electromagnets to be supplied, the sequence, the amplitudes and polarity.

This arrangement allows control of polishing forces, i.e., the direction of the magnetic dipoles 611, and, therefore, permits, as explained hereinabove in reference to FIG. 2, either a strong magnetic field that enhances the polishing force or a weak magnetic field that allows a more precise utilization of the polishing process.

This arrangement also provides enhanced magnetic phenomena in MPF 112 in applicable locations and concurrently provides for removal of MPF 112 from other locations for recycling, cleaning or remixing. Frequently, there is a need to remove MPF 112 in order to exchange the MPF for a different type of fluid more suited for the task, in order to clean the poles and cylinders for maintenance, or for other reasons. It is also sometimes desirable to change the chemical/physical properties of the MPF 112 by remixing in a mixer with different additives and reapplying to the cylinder. The removal is difficult due to acting magnetizing forces. The electrical coils can be switched off, thus eliminating the magnetic pulling forces on the MPF and the latter can be easily removed. This advantage does not exist with permanent magnets.

Figure 7A:
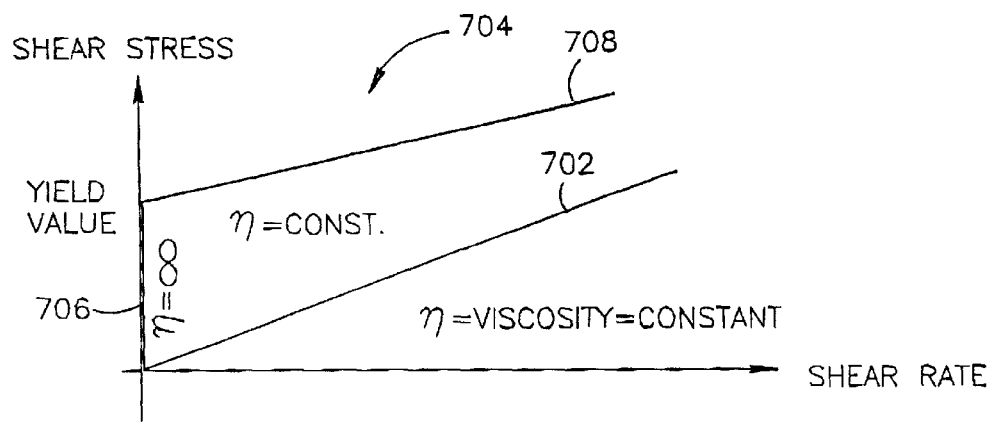
FIG. 7A is a characteristic diagram of viscosity profiles for two Theological fluids: a Newtonian and an idealized Bingham.

Reference is now made to FIG. 7A, a characteristic diagram of viscosity profiles for two fluids: a non-rheological one, with a Newtonian profile, and a rheological one with a Bingham profile. The mathematical models describing the two fluids are as follows:

Newtonian: $\tau = \eta \times \delta$

Bingham Plastic: $\tau = \eta_p \times \delta + \tau_y$

Where, $\tau$=Shear stress $\tau_y$=Static yield value of shear stress $\delta$=Shear rate $\eta$=Constant coefficient of viscosity $\eta_p$=Coefficient of viscosity beyond yield point It is noted that shear stress is the force required to move unit areas of fluid and sustain unit flow. Shear stress is measured in $N/m^2$ units. Shear rate is the velocity of a fluid's movement in a given plane relative to a reference plane, divided by the distance between them. The units for shear rate are (m/sec)/m or $SEC^{-1}$. Viscosity is the ratio of shear stress to shear rate. Consequently, the units are $(N \times sec)/m^2$, or Poise (dyne-sec/centimeter) in CGS units.

For most fluids, viscosity is not a constant but varies with shear rate. Such fluids are rate dependent. In a few systems, shear rate and shear stress are in direct proportion. Such fluids have a constant viscosity and are termed Newtonian fluids. Water and oils are typical examples of the latter.

Some fluids have a certain critical shear stress that must be exceeded before flow can begin. This critical shear stress is called "yield value". If, after crossing yield value, the fluid exhibits Newtonian flow characteristics, the fluid is called a "Bingham Plastic Fluid".

When considering the above definitions, viscosity (as depicted in FIG. 7A) is represented by the angle of inclination of the curves. The Newtonian curve, designated as 702, is a straight line and, therefore, maintains a constant viscosity for all temperatures and pressures.

The idealized Bingham plastic fluid curve, designated as 704, is constructed of two successive parts: a vertical line (designated as 706) from the axis origin up the shear stress axis to the yield value and, the second part, (designated as horizontal line 708) a straight line that resembles the Newtonian curve 702.

The vertical part 706 represents an infinitely high viscosity value of the fluid, or a solid like state of matter. Applying force and crossing the yield value causes a drastic drop in viscosity, (horizontal line part 708) down to the region of Newtonian fluids. In a polishing process using MPF, it is very desirable to stay in the region of infinite viscosity (vertical part 706) as much as possible, as it ensures very high removal rates and uniformity.

The shear rate caused by the polishing process transfers the Bingham fluid into the low viscosity region (part 708). In the invention, once this happens, the part of fluid that underwent this transition is prevented from being exposed to the shear rate of polishing, either by removing the magnetic field acting upon it, or by removing the fluid temporarily from the polishing process. Then, due to the restoration of the magnetic field, the fluid regains its very high viscosity and is applied anew to the polishing process.

Figure 7B:
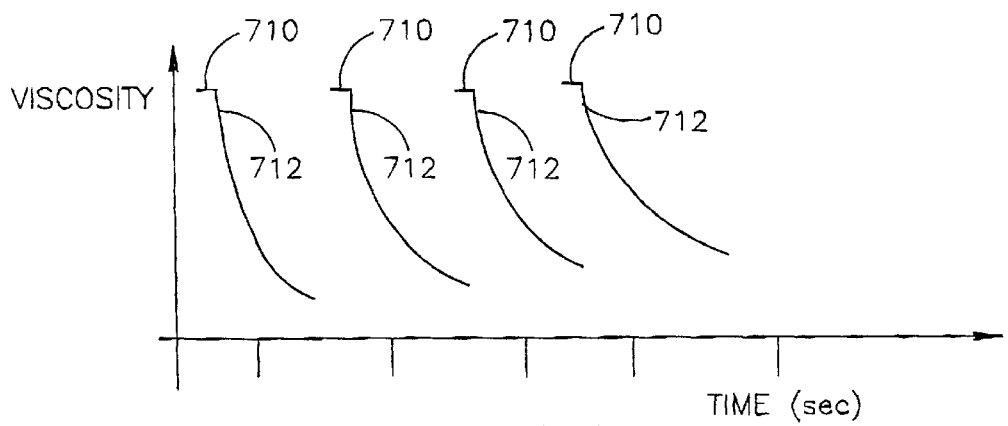
FIG. 7B is a characteristic diagram of the apparent viscosity of Bingham magnetic polishing fluid in the process of the present invention.

The apparent viscosity of Bingham magnetic polishing fluid in the process is represented in FIG. 7B. It is noted that each time the viscosity is high, points 710, the magnetic field is re-applied or shear stress is removed, and each time the shear stress has crossed the yield value, points 712, the viscosity drops.

It will be appreciated by persons skilled in the art that the present invention is not limited to what has been particularly shown and described hereinabove.

Rather the scope of the present invention is defined only by the claims which follow:

1. A system for polishing a surface, said system comprising:

a polishing material; and one or more magnetic means in contact with said polishing material, for reacting upon said polishing material to plasticize such, whereby said plasticized material is used to polish said surface.

2. A system according to claim 1, wherein said polishing material is in intermittent, repeated contact with said surface for polishing.

3. A system according to claim 1, and comprising a means for intermittently magnetizing said one or more magnetic means.

4. A system according to claim 1, wherein said one or more magnetic means are one or more permanent magnets.

5. A system according to claim 4, wherein said permanent magnets are placed in alternating directions.

6. A system according to claim 3, wherein said means for intermittently magnetizing is a shuttle for intermittently acting upon said one or more magnetic means, causing said magnetic means to provide a magnetic field when acted upon.

7. A system according to claim 1, wherein said one or more magnetic means are one or more electromagnets.

8. A system according to claim 7, wherein said one or more electro-magnets are driven by an alternating current (AC).

9. A system according to claim 1, and further comprising a cylinder, wherein said one or more magnetic means are laid along the longitudinal axis of said cylinder, which is rotatable along said longitudinal axis, and said plasticized material covers said cylinder.

10. A system according to claim 9, wherein said one or more magnetic means are flush with the outer surface of said cylinder.

11. A system according to claim 9, wherein said one or more magnetic means protrude from the outer surface of said cylinder.

12. A system according to claim 9, wherein said one or more magnetic means are recessed in the outer surface of said cylinder.

13. A system according to claim 9, and further comprising:

a vessel holding a pool of said polishing material, wherein a lower portion of said cylinder sits in said pool.

14. A system according to claim 9, wherein said cylinder further comprises an array of tubes containing a supply of said polishing material for secreting from said array of tubes onto the outer surface of said cylinder.

15. A system according to claim 9, and further comprising a trimmer.

16. A system according to claim 9, wherein said magnetic means has a spiral pattern.

17. A system according to claim 9, and further comprising a wire mesh covered said cylinder.

18. A system according to claim 9, and further comprising a metal-wool blanket covered said cylinder.

19. A system according to claim 18, wherein said blanket comprises ferromagnetic materials.

20. A system according to claim 18, wherein, said blanket comprises non-metal materials.

21. A system according to claim 9, wherein said cylinder comprises a ferro-magnetic mandrel, inserted co-axially into the center of said cylinder, wherein an outer surface of said mandrel contacts with said magnetic means, causing said magnetic means to provide a magnetic field upon said contact.

22. A system according to claim 1, wherein said surface is a silicon wafer.

23. A system according to claim 1, wherein said surface is a planar surface.

24. A system according to claim 1, wherein said surface is a curved surface.

25. A system according to claim 9, wherein said cylinder comprises an array of electromagnets.

26. A method for polishing a surface, said method comprising the steps of:

plasticizing a polishing material by bringing magnetic means into contact with said polishing material;

contacting said surface with said plasticized polishing material upon said contact with said surface, liquidizing said plasticized polishing material;

re-plasticizing said liquidized polishing material after termination of said contact with said surface; and repeating all the steps above a multiplicity of times until said surface is polished.

27. A method according to claim 26, wherein said step of plasticizing comprises the step of causing said polishing material to gain Bingham properties.

28. A method according to claim 26, wherein said step of liquidizing comprises step of causing said polishing material to gain Newtonian properties.

29. A method for polishing a surface, said method comprising the steps of:

bringing magnetic means into contact with a polishing material;

intermittently magnetizing said magnetic means whereby said polishing material is plasticized;

repeating said step of intermittently magnetizing said magnetic means a multiplicity of times until said surface is polished.

30. A method according to claim 29, wherein said step of intermittently magnetizing said magnetic means comprises the step of moving an iron shuttle adjacent to said magnetic means.

31. A method according to claim 29, wherein said step of intermittently magnetizing said magnetic means comprises the step of supplying intermittent current to said means.

* * * * *